March 22, 1966  B. JORGJI  3,241,226

METHOD OF DEFORMING AND CONNECTING A BEARING TO A SUPPORT BODY

Filed May 19, 1964

Inventor:
Bernard Jorgji
By: Spencer & Kaye
ATTORNEYS 3,241,226
METHOD OF DEFORMING AND CONNECTING A BEARING TO A SUPPORT BODY
Bernard Jorgji, Hamburg-Lokstedt, Germany, assignor to Licentia Patent-Verwaltungs-G.m.b.H., Frankfurt am Main, Germany
Filed May 19, 1964, Ser. No. 368,663
Claims priority, application Germany, May 21, 1963, L 44,922
4 Claims. (Cl. 29—441)

The present invention relates generally to the production of mechanical joints, and, more particularly, to a method of deforming a bearing for the spherical head of a cylinder piston in a support body which is to be connected with a cylinder piston in a ball and socket manner, with the bearing having the shape of a ball socket to be inseted in a bore of the support body.

It is already known to manufacture such ball sockets by metal working or metal removing tools or machines and to then insert them in the support body and finally to fixedly mount them in place. The quality of the material to be used for the ball sockets depends upon the surface or contact pressure which arises at the ball seat of the bearing. Since the actual surface pressure can hardly be determined sufficiently accurately in a mathematical manner because of the indefinite parameters regarding the size and the momentary condition of the contact points of the large area and additionally spherically curved ball sockets, relatively high quality construction materials must be used for safety reasons.

In those cases where the cylinder pistons which are to be supported have pressure fluid passing through them, as for example in a hydraulic axial piston engine, the material of the ball socket must also possess further special characteristics in order to be able to seal the ball end which bears against the escape of pressure fluid to the outside, and this material must be very carefully machined to achieve this effect.

It is a main object of the present invention to provide a method for making a ball socket bearing of the character described in which the technical expenditure previously required to construct such a bearing is substantially decreased.

It is another object of the invention to make possible the manufacture of a satisfactory ball seat, while accomplishing the preceding object.

A further object is the production of a ball socket of one piece which is small in volume and provides for advantageous utilization of material.

These objects and others ancillary thereto are accomplished in accordance with preferred embodiments of the invention, wherein a ball socket is provided which is formed interiorly with a longitudinally profiled hollow cylinder prior to its being inserted in the support body and while it is in rough machined condition. It is subjected to a stepwise deformation and/or hardening after it is inserted in the support body. This is accomplished at all bearing places in the support body and at the cylinder piston head by pressing dies and/or hammering or striking tools. This deformation or hardening assures that the ball socket is connected with the support body as well as with the head of the cylinder in a sealing manner conforming to the shape of the parts, and if required forming a seal against pressure fluid.

Additional objects and advantages of the present invention will become apparent upon consideration of the following description when taken in conjunction with the accompanying drawings in which.

Figure 1:
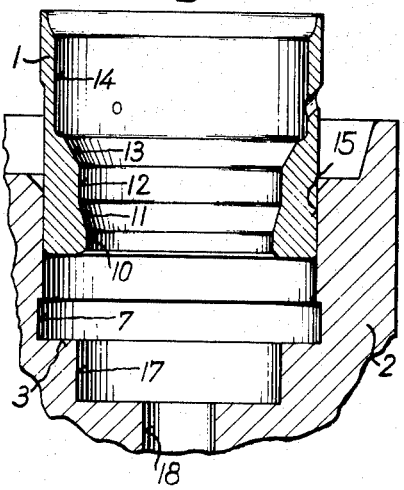
FIGURE 1 is a diagrammatic sectional view of the ball socket in a preliminary stage.

With more particular reference to the drawings, FIGURE 1 illustrates the ball socket 1 in an initial condition where it is preformed as a sleeve and is externally cylindrical and longitudinally profiled on its interior. The interior cross section of the sleeve includes a first portion 10 of uniform diameter adjacent a first transition portion 11 to a second portion 12 of uniform diameter which is larger than portion 10. A second transition portion 13 is disposed between portion 12 and a third portion 14 of uniform diameter which is even larger than portion 12. This socket member 1 is pressed into a cylindrical recess 15 in the support body 2. Near the bottom of recess 15 is an annular chamber or clearance recess 7 of larger diameter than recess 15. Below this is a further chamber 17 of a smaller diameter than recess 15. A bore 18 is in communication with chamber 17. After this inserting operation, the lower end face of the ball socket 1 contacts the annular bottom surface 3 of the support body 2 with a certain amount of pressure.

Figure 2:
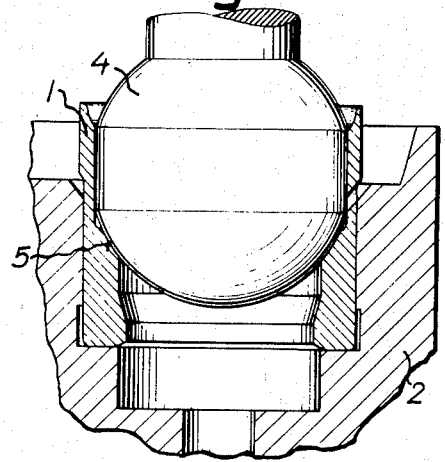
FIGURE 2 is a sectional view similar to FIGURE 1 illustrating a hammering tool disposed in the socket.

Then, as shown in FIGURE 2, a hammering tool 4 is inserted into the ball socket 1 which is shown as being pressed completely into the recess 10 so as to abut the surface 3. By means of the calotte-shaped head of striking tool 4, the seat 5 for the ball end of the cylindrical piston is produced, from second transition portion 13, by striking, and is hardened at the same time. The curvature of the ball seat 5 is chosen to be flatter or shallower than the corresponding surface of the ball end of the cylinder piston which will contact the seat. Because of this, the surface pressure at the ball seat, which is required for preventing the escape of pressure fluid, can be attained.

Figure 3:
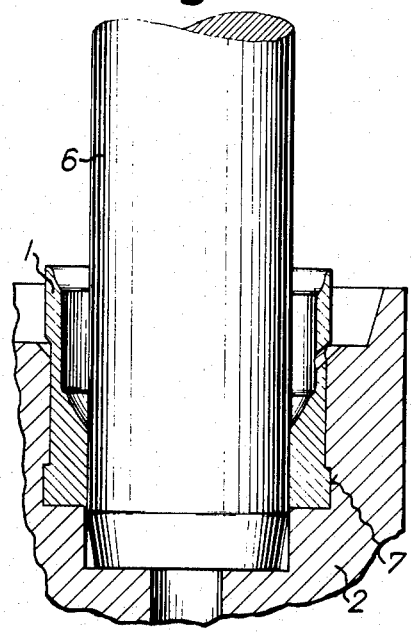
FIGURE 3 is a sectional view similar to FIGURE 1 wherein the ball socket is being widened.

As shown in FIGURE 3, a conically tapered cylindrical mandrel 6 is inserted into the ball socket 1 and with the use of this mandrel the ball socket is widened on the inside at its lower end and its outer shape is pressed into the clearance recess 7 of the support body 2. As the mandrel moves into the position shown in FIGURE 3 its tapered leading edge engages transition portion 11 and forces the material of the sleeve to conform to the inner surface of recesses 10 and 7 and the outer surface of mandrel 6 which is the same diameter as chamber 17. By means of this operation, the ball socket 1 is firmly anchored in support body 2.

Figure 4:
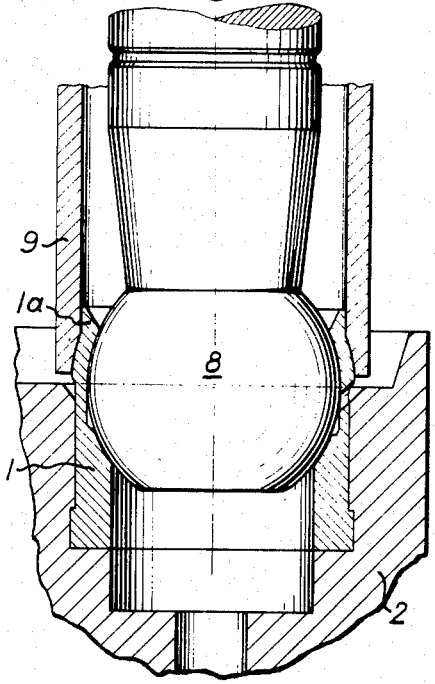
FIGURE 4 is a sectional view similar to FIGURE 1 wherein the cylinder piston head is inserted in place in the ball socket.

As shown in FIGURE 4, after the cylinder piston head 8 has been inserted into the ball socket 1, the upper portion 1a of the ball socket which begins approximately at the height of the center of head 8 of the cylinder piston is deformed by a pressure sleeve 9 in such manner that this portion 1a encompasses the oppositely located portion of the spherical surface of the cylinder piston head 8. By this means a retaining shell is provided which retains the cylinder piston head in the support body 2, yet which allows universal pivotal movement thereof.

By means of the exemplary method which has been disclosed, it has been illustrated that with the present invention a ball socket bearing can be made from a single piece. Such a ball socket bearing takes up little space, permits advantageous utilization of material, and has spherical bearing surfaces which can be reliably reduced to a minimum and which are also controllable with respect to the determination of friction conditions in a better manner.

The technical expenditure previously required to construct such a bearing is substantially decreased, especially because the hardening of the seat 5 is made at the same time as the forming of this seat by the striking tool 4. The surface of the bearing is formed so exact, that no other means for preventing the escape of pressure fluid is required.

It will be understood that the above description of the present invention is susceptible to various modifications, changes and adaptations, and the same are intended to be comprehended within the meaning and range of equivalents of the appended claims.

What is claimed is:

1. A method for producing a bearing for the spherical head of a cylinder piston to be connected to a support body in a ball and socket manner, the bearing having the shape of a ball socket to be inserted in a bore of the support body, the steps comprising:

forming a ball socket member which is rough machined to form a hollow cylinder longitudinally profiled;

inserting said cylinder in a bore of the support body; and deforming and hardening the hollow cylinder, after it is pressed into the support body, at all bearing locations in the bearing body and at the cylinder piston head and in a stepwise manner by means of striking tools by means of which deformation the ball socket is connected with the support body as well as with the head of the cylinder piston in a sealing manner conforming to its shape.

2. A method of making a bearing for the spherical head of a cylinder piston to be connected to a support body in a ball and socket manner, the steps comprising:

forming a ball socket member which is rough machined to form a hollow cylinder which is longitudinally profiled;

pressing the ball socket member into a bore in the support body to the full depth thereof;

providing a ball seat in said member by deforming and hardening to form a flatter curve than the spherical head of a cylinder piston to be inserted therein;

fixedly mounting the member in the support body by widening it into a clearance recess in the body;

inserting the cylinder piston head into the ball socket member; and deforming that portion of the ball socket member which begins approximately at the height of the center of the cylinder piston head so that it encompasses the portion of the spherical surface of the cylinder piston head disposed opposite the ball seat.

3. A method of making a bearing for the spherical head of a cylinder piston to be connected with a support body in a ball and socket manner, comprising the steps of:

forming a cylindrical bore in the support body with a clearance recess near the lower end thereof and of larger diameter than said bore;

forming a rough machined ball socket member in the form of a hollow cylinder which is longitudinally profiled to have a first and lower portion of uniform diameter, a second portion of uniform diameter above said first portion and of larger diameter, a third transition portion between said first and second portions, a fourth portion of uniform diameter above said second portion and of larger diameter, and a fifth transition portion between said second and fourth portions;

pressing said ball socket member into said bore to the full depth thereof;

deforming said fifth transition portion to provide a seat for the spherical head of a cylinder piston and which is curved flatter than the piston head;

deforming said first and third portions to force the material of the cylinder into said clearance recess to fixedly mount the ball socket member in the support body;

inserting the spherical cylinder piston head into the ball socket member; and deforming that part of said fourth portion which begins approximately at the height of the center of the cylinder piston head so that it encompasses the portion of the spherical surface of the cylinder piston head disposed opposite the ball seat.

4. A method as defined in claim 3 wherein the step of deforming to provide a seat includes striking said fifth transition portion to harden the seat.

References Cited by the Examiner

UNITED STATES PATENTS

| | | | |
|---|---|---|---|
| 2,361,046 | 10/1944 | Molly | 29—441 X |
| 2,365,067 | 12/1944 | Gauld | 29—441 X |
| 3,049,800 | 8/1962 | Neff et al. | 29—441 |

WHITMORE A. WILTZ, *Primary Examiner.*